United States Patent

Silverman et al.

[11] 3,947,661
[45] Mar. 30, 1976

[54] ACCESS AUTHENTICATING SYSTEM

[76] Inventors: Daniel Silverman, 5969 S. Birmingham Ave., Tulsa, Okla. 74105; Everett A. Johnson, 15 S. Prospect Ave., Park Ridge, Ill. 60068

[22] Filed: June 18, 1974

[21] Appl. No.: 480,357

Related U.S. Application Data

[63] Continuation-in-part of Ser. No. 272,686, July 17, 1972, Pat. No. 3,818,190, which is a continuation of Ser. No. 74,066, Sept. 21, 1970, Pat. No. 3,677,465.

[52] U.S. Cl........ 235/61.7 R; 355/42; 235/61.11 E; 235/61.12 R
[51] Int. Cl.² G06K 7/10; G06K 19/02; G03B 27/52
[58] Field of Search.. 235/61.11 E, 61.12 R, 61.7 B, 235/61.7 R; 226/9; 346/76 L; 355/40–42, 6, 78; 194/4 R; 353/26

[56] References Cited
UNITED STATES PATENTS

| | | | |
|---|---|---|---|
| 3,039,582 | 6/1962 | Simjian | 194/4 R |
| 3,255,339 | 6/1966 | Rausing | 235/61.7 B |
| 3,267,800 | 8/1966 | Baillod | 355/42 |
| 3,373,270 | 3/1968 | Fenner | 235/61.11 A |
| 3,492,072 | 1/1970 | Haun | 355/78 |

*Primary Examiner*—Daryl W. Cook
*Assistant Examiner*—Robert M. Kilgore

[57] ABSTRACT

There is disclosed apparatus and method for unerasably marking computer and other information records and the like in a precise, machine readable manner so as to identify the particular record, and to control access to the record by providing means for authenticating a control member presented for access to the record. The illustrated system involves preparing a master card of opaque material through which micro patterns have been burned by a laser. This master is used to produce a facsimile pattern in a control member and/or the record to be identified and retrieved. The facsimile card is used as control member and the micro pattern compared with a bank of unique micro patterns to authenticate the pattern bearing control member and to identify the record bearing a similar micro pattern. The bank of master micro patterns may comprise a plurality of master cards, or may conveniently be on a reel or strip of material, with separate frames or areas, each having its unique pattern of microperforations, with an index corresponding to the indicia of individual patterns. Details of such an indexed bank are disclosed in our copending application Ser. No. 272,739.

12 Claims, 14 Drawing Figures

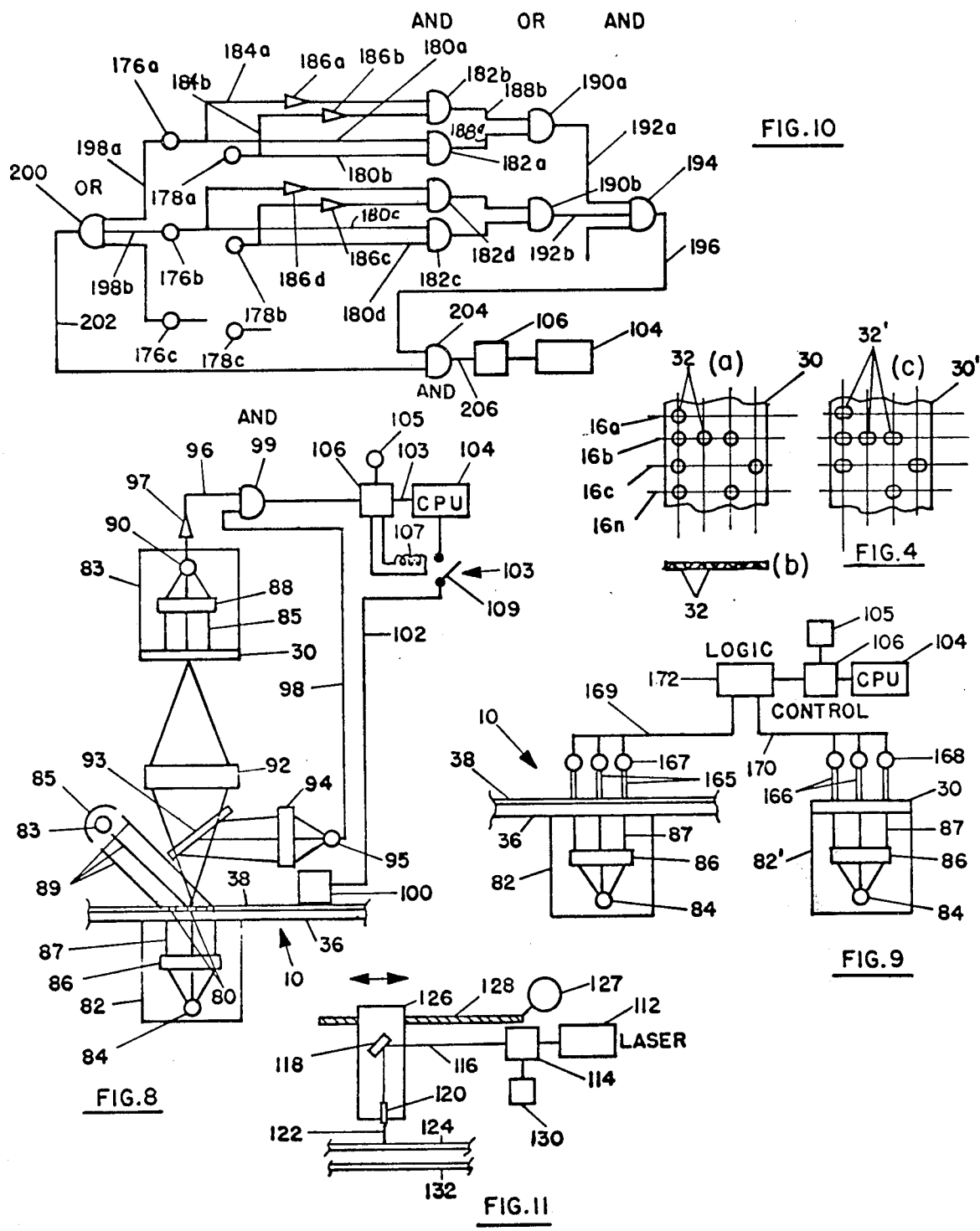

ACCESS AUTHENTICATING SYSTEM

RELATED APPLICATIONS AND PATENT

This application is a continuation-in-part of our copending application Ser. No. 272,686, filed July 17, 1972, now U.S. Pat. No. 3,818,190, entitled AUTHENTICATION OF ACCESS TO INFORMATION RECORDS, which in turn is a continuation of Ser. No. 74,066, filed Sept. 21, 1970, now Pat. No. 3,677,465, entitled METHOD AND APPARATUS FOR AUTHENTICATION OF INFORMATION RECORDS. A related application is our copending application Ser. No. 272,739, filed July 18, 1972, entitled ACCESS CONTROL SYSTEM, now U.S. Pat. No. 3,829,661.

Also, in the matter of security there is no really satisfactory way of preventing an unauthorized user from taking a reel of restricted information tape and reading it off the tape into a computer or transcribing it onto a second tape.

OBJECTS OF THE INVENTION

The objects of the invention can be expressed as follows:
1. to authenticate the ownership of the information record,
2. to provide an unerasable, machine readable index of identity and/or ownership that is impossible readily to identify without a facimile of the index pattern,
3. to provide a type of pattern that is distributed over an appreciable length of the record so that it cannot be removed by excising a terminal portion of the record,
4. to provide an authentication system that can be applied to (a) magnetic tapes and cards, (b) microfilms and microficne, and (c) punched paper tapes and cards, etc.
5. to provide methods and apparatus for controlling the operation of a data reading machine to prevent or modify its operation if the pattern of authentication on the medium does not agree with the pattern of a facsimile card inserted into the machine to read the authentication.
6. to provide a method of manufacture of the originals and facsimile card copies of the characteristic authentication patterns of different owners, and
7. to provide a method of authentication of an extended length record medium that can be applied throughout the length of the medium without affecting its use as a data carrying record.

GENERAL DESCRIPTION OF THE INVENTION

The invention will for convenience, be described in a general way with regard to authenticating a magnetic tape record.

A magnetic tape can be identified as to ownership and to data content by
a. man readable markings on the reel on which the tape is wound,
b. man readable markings on the ends of the tape or on the tape leaders.

Both of these systems can be altered at will by rewinding onto another reel, or by cutting off the end of the tape or the leader. The system of this invention is unerasable, can be made to be unreadable by the naked eye, but easily readable by machine. It can be applied at the ends and also at precisely determined positions along the length of the strip or tape.

In one form, the invention provides for applying to the magnetic tape a precisely focussed laser beam that can burn small holes through the magnetic coating in a specific pattern to form transparent spots through the coating that can be read by reflection or by transmission through the transparent plastic backing strip. The laser can be applied through a corresponding pattern of holes in a thin metal plate or card, originally burned through the metal card by laser beam. Similarly the pattern can be read photoelectrically by using a facsimile plate and determining whether the pattern on the magnetic tape is identical with that on the facsimile card.

DESCRIPTION OF THE DRAWINGS

These and other objects of the invention and a better understanding of the invention will be apparent from the following detailed description taken in connection with the attached drawings, in which:

FIGS. 4a, 4b, 4c, illustrate two types of spot patterns.

FIG. 8 represents an improved apparatus for reading the pattern.

FIGS. 9 and 10 represent a preferred embodiment of this invention, and

FIG. 11 illustrates apparatus by which the master and facsimile cards can be produced.

DESCRIPTION OF THE EMBODIMENTS

This invention is applicable to all types of information storage media, but will be described in terms of magnetic digital tape. The purpose of the authentication are:
1. to represent in a permanent, unerasable, non-counterfeitable manner the ownership of the tape,
2. to ensure that when the data on the tape is to be used in a computer, or transcribed to another magnetic tape or to an archival record medium, the tape and the data on it are of the proper ownership.
3. to ensure that when the tape is to be used in the computer in a specific program, the computer will not accept the data unless the tape authentication pattern is present and is the correct one.

Figure 1:
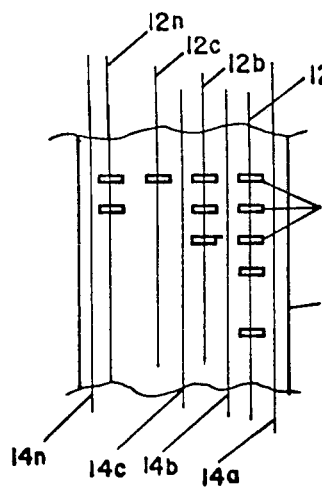
FIG. 1 represents a portion of an information record to which this invention can be applied.

One form of authentication is to provide (as in FIGS. 1, 2, and 3) a characteristic pattern of machine recognizable spots. These are placed in positions on the tape which are not used in the normal information storage process. FIG. 1 shows such a tape 10 with magnetized spots or areas 22 arranged in tracks 12a,b–n.

Figure 2:
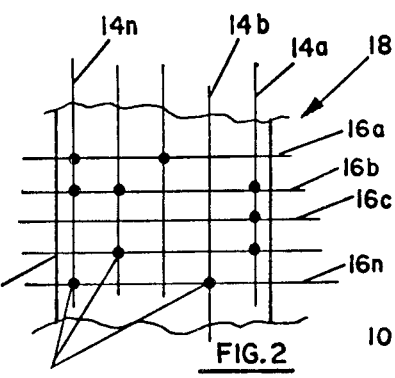
FIG. 2 illustrates one possible embodiment in the form of a pattern of spots applied to a portion of an information strip.
Figure 3:
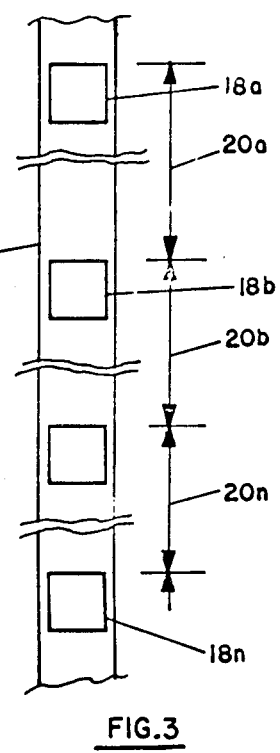
FIG. 3 illustrates how the pattern of FIG. 2 can be applied at a plurality of positions along a strip record.

In the intertrack spaces 14a,b–n are placed markings, spots or small areas of a unique character that is readable by machines of a special nature. In FIG. 2 are shown a plurality of spots 24 in a two-dimensional array of spots arranged on longitudinal lines 14 (in the intertrack areas) and transverse spaced lines 16a,b–n. The pattern 18 of spots 24 is a unique (one of a kind) pattern which is used to authenticate the tape. Each owner will have a different unique pattern. The invention contemplates also using a plurality of similar patterns 18a, 18b–18n arranged along the tape in a second unique pattern of spacings or distances, 20a, 20b, 20n etc. Thus, by the nature or character of the individual spots 24, by the unique spacing pattern 20 of the patterns 18 along the tape 10 is the authentication and ownership of the tape confirmed.

In FIGS. 4a, 4b, are shown a pattern card 30 which can be a thin opaque card with a plurality of transparent or perforated areas or spots 32 arranged in a unique pattern. This pattern is characteristic of a specific owner or client, all of whose digital storage media are to be authenticated with this pattern. In general, the spots will be microscopically small so they can be placed in the inter-track spaces without affecting the operation of the magnetic tape in its normal use. Also complex patterns can be used that are more difficult to copy or counterfeit. These pattern cards can be constructed as shown in FIG. 11. Here a thin sheet 124 of high melting or boiling temperature metal is placed in conjunction with a laser 112, light modulator 114, mirror 118 and optics 120 which focusses the laser light 116 to a spot 122 of small area and high energy density, sufficient to burn a hole through the thin metal 124. The mirror 118 and optics 120 are carried on a frame 126 which is adapted to be precisely positioned in perpendicular coordinates (only one of which is shown) by screw means 128 and motor 127, as is well known in the art. The optics 120 is positioned at predetermined coordinates representing the desired pattern, and the holes are burned. These are very small, of the order of a few thousandths of an inch in diameter.

This pattern card or plate 124 is now the master pattern card and is carefully stored and guarded. Facsimile copies, such as 132 can be made in precisely the same pattern. One way to do this is to use the original card 124 as a template to control light passage to the facsimile card 132. The control 130 is used to weaken the beam 116 so that the card 124 will not respond to the laser beam and be evaporated further. However, the facsimile card 132 can be made of lower boiling temperature material, so that it will selectively respond and evaporate with a beam that will not burn 124. The carriage 126 is moved through a raster of positions such that as the beam 122 passes over the openings in 124 the light will pass through these openings and burn through the sheet 132. Sheet 124 can, for example, be titanium or any other of the exotic high temperature metals. Sheet 132 can be aluminum or copper or other relatively low melting temperature metal. Also the facsimile 132 can be a photographic film that can be exposed to a liminois source through the openings in 124. Also it can be a plastic sheet with an opaque coating that can be burned off or evaporated by the laser beam. One such type of coating is a fully exposed and developed (black) opaque silver halide emulsion on plastic film. Another type of medium would be a strip of plastic with a very thin layer of metal applied by evaporation onto the plastic strip, in vacuum. It will be clear also that a certain intensity of the laser beam will be required to burn perforations in the magnetic film on the plastic magnetic strip, which must be less than the intensity of the beam to burn holes in facsimile 132.

It will be clear that the process of removing material such as metal of the plate, or metal or other opaque coating on a transparent base, by the heat of the focussed laser beam can be called evaporation, oxidation, burning or similar term, all of which will be considered equivalent in this application.

Figure 6:
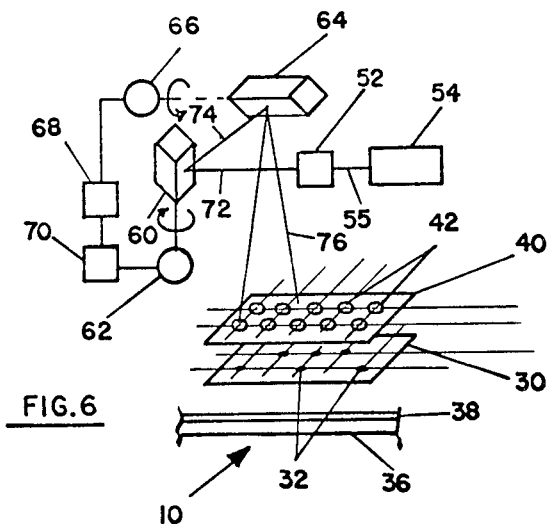
FIGS. 5 and 6 illustrate two methods of recording an authentication pattern on an information record.
Figure 5:
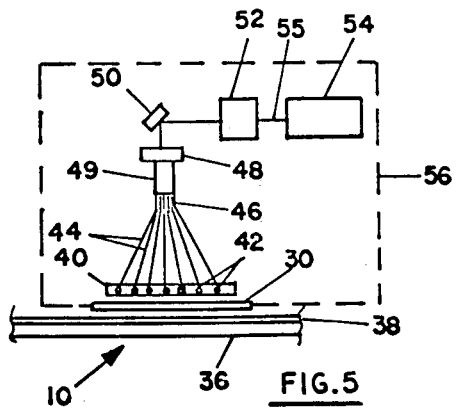

Having the pattern facsimile card, FIGS. 5 and 6 illustrate embodiments of this invention in which the facsimile is used to control the placement of the authentication pattern onto the record medium. In FIG. 5 is shown the magnetic tape 10, with plastic base 36 and evaporizable meltable or oxidizable thin opaque layer 38. The tape 10 is adapted to be transported longitudinally beneath the facsimile card 30, with its pattern of spots (not shown). Placed above the card 30 is a board 40 with a matrix of small lenses 42 held in the board. The card 30 and frame 40 are held in fixed relative position by guides (not shown) so that the spots in 30 are precisely positioned in the matrix of lenses. Light is conducted to the lenses by means of optical fibers 44 that are gathered together at their other ends 46 to a small area, exposed to the light. A laser 54 has a beam 55 passing through light modulator 52, to mirror 50, and to optics 48 which impresses its intense light onto the ends 46 of the optical fibers. Thus all the lenses in the plate 40 have light impressed on them. Those lenses 42 in matrix positions matching the spots in the facsimile card 30 will pass light through the openings in the facsimile card focussed on the layer 38 of the tape 10. The light from the laser exposed through the lenses and focussed on the card 30 is controlled by modulator 52 to be intense enough to burn holes through the opaque layer 38 forming transparent spots on the tape in the pattern of the facsimile card 30. In the mechanism of FIG. 5 the pattern of spots is impressed on the tape 10 simultaneously and rapidly, so that the recording of the spots can be done with the tape moving. In such case (such as where the spots are recorded by using the intense light of a pulsed laser, or when a short intense pulse of a continuous gas laser is used), the pattern of 30 can be repeated at intervals along the strip, the positions of which are coordinated with means in the tape handling unit well known in the art, that measures length or position along the tape. The positions, or distances 20 along the tape (FIG. 3) are chosen in a characteristic pattern, which provides additional secrecy and authenticity to the authentication of the record tape.

It will be clear that modifications can be made in FIG. 5, such that the fibers 44 can be rounded at their lower ends to form lenses of the proper focal length instead of using separate lenses 42. Also, the fibers 44 can be illuminated in groups, successively, if the intensity of the laser 54 is not great enough to illuminate them all at one time.

While the apparatus of FIG. 5 is designed to impress the entire pattern or matrix onto the tape 10 at one time, it is possible to scan the matrix with a single laser beam and impress the spots onto the tape successively, as shown in FIG. 6.

In FIG. 6 is shown again the tape 10 with plastic base 36 and opaque layer 38, and the matrix board 40 of lenses 42 as shown in FIG. 5. However, instead of impressing the light 55 from laser 54 simultaneously to all points in the matrix, the laser beam 55 is passed through modulator or control 52, and as beam 72 to a first rotating mirror 60 driven by motor 62 and then as beam 74 to a second rotating mirror 64 with drive motor 66. The two mirrors are set with their axes at right angles, respectively parallel to the two orthogonal axes of the matrix of 40. The motors 66 and 62 are synchronous and are driven by means of oscillator 68 and frequency divider 70 in precise ratio of rotation. Thus the two mirrors sweep out a raster of lines superimposed on the rows and columns of the matrix and covering all spots of the matrix board 40. By placing the facsimile card 30 precisely under the board 40, the authentication pattern is impressed on the tape.

In a combination application Ser. No. 60,399 of one of the coapplicants of this application, filed Aug. 3, 1970, a method is shown of burning holes in a record through perforations in a master card by scanning the pattern by a single focussed laser beam. Thus a single precise optics can replace the lens board with a plurality of focussing lenses. Such a system would be equally applicable to this invention. Those portions of application Ser. No. 60,399 pertaining to this laser copying procedure are incorporated herein by reference.

In FIG. 4a the pattern card or facsimile 30 is shown with circular small holes or perforations 32. In the recording process, shown in FIGS. 5 and 6 this type of pattern is used. However, when it comes to reading the pattern of holes, the tapes are not laterally guided to the precision of the dimensions of the circular holes. Thus, for reading, a slightly different facsimile card is used in which the circular holes are extended, 32' in FIG. 4c, along the direction of the rows 16.

This can be done in the process of copying a master card to a facsimile pattern card by relatively moving the master and the facsimile card along the direction of the rows by increments of a size corresponding to the dimension of the microperforations, and by scanning the surface of the master card between each incremental displacement. Thus, the miscroperforations in the facsimile card will each comprise a plurality of contiguous circular microperforations, which will comprise, in effect microperforations of elongated shape, the elongation being perpendicular to the direction of record traverse, and being in the direction of record weave or flutter. If the elongated dimension is equal to or greater than the weave of the record within the limits of guidance, then each microperforation in the record will be positively read by the facsimile card irrespective of the weave of the record.

While the most direct method of providing the elongated microperforations is to use a plurality of copying steps, it is also possible, as is well known in the art, to use opital means to change a circular point focus to a line focus. This utilizes combinations of sperical and cylindrical lenses or mirrors, and will provide the elongated oval shape of microperforations desired.

Figure 7C:
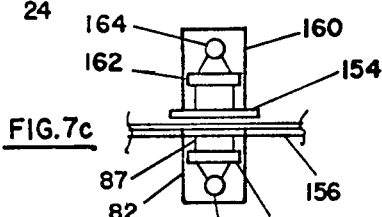
FIGS. 7a, 7b, 7c and 7d illustrate a special coding system and apparatus for reading the coded pattern.
Figure 7A:
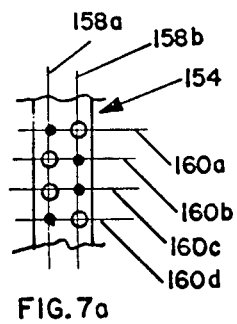

In FIGS. 7a, 7b, 7c and 7d are shown a method for coding spot patterns by which differences between the pattern being read and the facsimile pattern can be detected very simply. In FIG. 7a is shown the facsimile pattern 154 and in FIGS. 7b and 7d two possible tape patterns 156 and 156a. A very simple pattern of two rows 160a, 160b and two columns 158a, 158b are shown, with four possible spot positions in the matrix. With a redundancy factor of 2, 4 additional spot positions are shown 160c, 160d for each column. The logic is as follows. Assume the pattern has twp transparent spots (open circles) (158b, 160a) and (158a, 160b) while the other two possible positions are blank (closed small circles). In the second part of the pattern, rows 160c and d, the transparent spots and opaque spots are interchanged. In FIG. 7c is shown one reading apparatus. Here a lamp, 84, optics 86 in box 82 creates a collimated beam of light 87 directed upwardly through the tape 156 and the facsimile card 154 to another box 160 containing optics 162 and PE sensor 164.

The correct pattern on the tape is the direct opposite of the pattern on the facsimile card 154. That is, transparent and opaque spots are reversed. This can be done by making the reading pattern card a photographic copy of the facsimile card where a negative copy is provided. Thus it will be clear, that if the two patterns are alike, wherever a transparent spot occurs in one, an opaque spot occurs in the other so that when the two overlap there will be no light passed through. On the other hand if the two patterns are not identical, light will pass through to the P.E.S. 164, which will indicate the discrepancy.

Figure 7B:
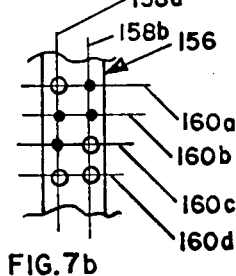
Figure 7D:
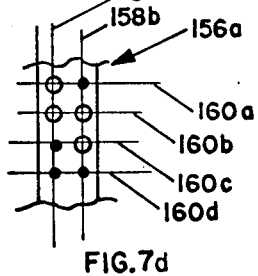

Consider the pattern 156a to be on the tape. This differs from 154 in having an additional (third) transparent spot at (160b, 158a). Superimposing the two patterns, it will be seen that light will pass through position (158a, 160b). Now, consider that instead of one additional transparent spot being present in the tape pattern, there is one less transparent spot present. That is, spot (160b, 158b) is missing. This is shown in FIG. 7b where spot (158b, 160b) is missing. When the two patterns 154 on the facsimile card and 156 on the film are superimposed, light will pass through (160d, 158b). Thus, by this system of coding, the patterns on the tape and on the facsimile card must have the exact same number of spots in the same positions to get the proper pass signal, (no light passage), remembering that the patterns are opposite on card and film.

We have, in FIGS. 5 and 6 described two embodiments of apparatus for placing or impressing the authentication patterns on the record. Also, in FIGS. 7a, 7b, 7c and 7d we show a method of using one particular coding system whereby the pattern can be read very simply. In FIG. 8 we will further describe an optical system, and in FIGS. 9 and 10 an opto-electronic system for comparing patterns on the tape and the facsimile card.

In FIG. 8 we show the tape 10 with opaque layer 38 over transparent support web 36, and with microperforations 80 represented in the opaque layer. In a housing 82 below the tape is a lamp 84, optics 86 which sends a collimated beam 87 up to the tape, illuminating the perforations 80. Above the tape is optics 92 which images the pattern of illuminated spots 80 onto the facsimile card 30. The light 85 passing through the facsimile card perforations into the housing 83 is compressed by optics 88 onto the photosensor 90. The photosensor 90 acts as an OR gate, by placing a signal or line 96 whenever any one of the perforations in card 30 passes light. This card is of the type coded as in FIG. 7.

To be sure that light is passing through the tape or film, a beam divider 93 takes part of the light passing through the film, and by means of optics 94 compresses it onto photosensor 95. So, when there is light on 95 but no light on 90, we have the correct pattern. A simple logic to handle this condition provides a polarity inverter amplifier 97 which provides a positive signal when no light reaches 90. This signal and the output of sensor 95 both go to an AND gate 99. The AND gate is designed to give an output signal to the control 106 only when the same signal appears on both input leads, that is, when no light falls on 90 and light falls on 95. The signal to the control 106 can operate an alarm 105. Conversely, (as is well known in the art) the control 106 can control the signal input to the computer (CPU). The magnetic reading heads 100, operating against the tape 10 have output signals on line 102 which go to the CPU through relays 103. The coils 107 of the relays are connected to the control 106. Thus when the pattern on the tape matches the pattern on the card, the relay 103 will pull in and permit operation of the CPU. Other types of control (symbolized by line 103) can of course be used, as is well known in the art.

We show schematically in FIG. 8 a lamp 83 and reflector 85 illuminating the tape 10 with beam 89. If the spots on the tape are contrasting in color or reflectance, the pattern will be imaged onto the facsimile card as before. Thus the pattern can be read by light transmission or by light reflection.

In FIGS. 7 and 8 the patterns on the tape and card are compared as a whole, and the choice of whether a match is made or not is dependent on whether or not any light reaches the sensor. In FIGS. 9 and 10 we show another system in which separate sensors are provided for each point in the pattern. Proper electronic logic is then provided to compare corresponding points in the pattern to be sure each point location is the same (that is, open or closed, transparent or opaque).

In FIG. 9 we show the tape 10, with opaque layer 38 and translucent or transparent web 36. This passes over lamp housing 82 with lamp 84, optics 86 and collimated beam 87. A plurality of optical fibers 165 leading to PE sensors 167 are arranged in a pattern corresponding to the matrix of possible positions of spots in the pattern on the tape and card. Similarly, a separate lamphouse 82' impresses on a corresponding plurality of optical fibers 166 and PE sensors 168 light that passes through the microperforations of card 30. Signals from the two groups of sensors go by lines 169, 170 to a logic box 172 which signals the control 106 and the CPU 104 as in FIG. 8.

In FIG. 10, we show schematically the sensors 176a, 176b, 176c, etc., from the group 167 responsive to the tape, and corresponding sensors 178a, 178b, 178c, etc., from the group 168, responsive to the card. In general there may be a large number of these but for simplicity we show only three, and will only show the logic connections to two.

Leads 180a, 180b go from corresponding sensors 176a and 178a to an AND gate 182a, which has an output line 188a. When light is applied to both 176a and 178a positive signals go to 182a, and under the condition a positive signal will appear on 188a. When both 176a and 178a are dark, a negative signal appears on their leads 180a, 180b. But the AND gate only works with positive signals. So parallel leads 184a, 184b go to polarity inverter amplifiers 186a, 186b which convert the negative signals to positive signals. These then go to AND gate 182b. The output lines 188a, 188b go to an OR gate 190a. The OR gate will put out a positive signal on 192a when either one or the other of input leads 188a, or 188b carries a positive signal.

To review, if both 176a and 178a are light a positive signal goes from each to 182a which then sends a positive signal to 190a. If both 176a and 178a are dark, they put out negative signals which are inverted to positive signals by amplifiers 186a, 186b. They then go to the AND gate 182b and place a positive signal on 190a. So, whether the two sensors are both light or both dark the OR gate 190a sends a positive signal to the final AND gate 194. If both 176a and 178a are not alike then 192a carries a negative signal. The AND gate 194 has input leads corresponding to each pair of sensors, and if each pair are alike, whether light or dark, a positive signal appears on the corresponding input to 194, and a positive output signal appears on output 196.

Again, as in FIG. 8, we need to know whether a pattern is in position in the tape over the lamphouse 82, so we take leads 198a, 198b, etc. from sensors 176a, 176b etc. to OR gate 200. If any one of the sensors shows light, then a positive signal appears through 202 to AND gate 204 which corresponds to AND gate 99 of FIG. 8. Therefore, if any one of the tape sensors shows light and if all pairs of sensors have the same light or dark then positive signals will appear on lines 196 and 202 and gate 204 will send a signal to control 106, and appropriate response can be made as discussed in connection with FIG. 8.

While we speak interchangeably of pattern card, master pattern card and facsimile pattern card in the step of impressing the authentication pattern on the record and the step of reading the authentication pattern and comparing it to the pattern of the pattern card, any of the cards can be used and we will simply call them pattern cards. Also, while we speak generally of patterns of spots, we mean particularly geometric patterns of microscopic spots or microscopic perforations or microperforations, which cannot be precisely read by eye, but can be precisely read by optical means, by comparison with the precisely prepared pattern card from which the pattern on the record medium was originally made.

While a number of embodiments of this invention have been described and illustrated, additional embodiments will be conceived by those skilled in the art based on the principles enunciated, all of which embodiments are considered to be part of this invention, the scope of which is to be determined from the scope of the appended claims.

Our invention provides an access control for selectively granting access on presentation and authentication of a control member comprising a carrier means with machine readable indicia thereon and having unique coded micro space pattern means. The coded patterns may comprise an array of redundant coded patterns, an array of microperforations, etc. Control member authentication means includes means responsive to the indicia and a bank of the authenticating master patterns, the responsive means selecting the appropriate master pattern from the bank, and means for comparison of the coded pattern with the authentication pattern selected from the bank of master patterns. When the compared patterns correspond, access is authorized which may include a print out, a display, a delivery of an item carrying a coded pattern, or access to perform a function such as to erase, supplement, or revise a record.

The invention further provides an information storage system, including method and apparatus, for controlling and authenticating access to an information storage record, comprising the preparation of pattern card means containing a predetermined unique geometrical pattern of microperforations, by burning the pattern into the pattern carrier means using a pulsed, focused beam of laser radiation. Then by using the pattern carrier means as a mask, an unerasable authentication pattern of micriperforations corresponding to said pattern on the carrier means is applied to the record. This can be done by passing continuous focused laser radiation through the microperforations of the pattern carrier means by scanning laser radiation over the surface of the pattern carrier means.

Other embodiments include controlling the reading of data from the record in response to the comparison of the patterns, and optionally at least two spaced positions along the record and determining the spacing between the at least two positions, and further comparing the determined spacing with the known coded spacing. The reading of data from the record is accordingly controlled in response to the step of comparing the spacings; and the comparisons can be made at each of the plurality of spaced patterns on the record.

Although a number of embodiments of our invention have been described and illustrated, additional embodiments will become apparent to those skilled in the art in view of our disclosure; all such embodiments are considered a part of this invention, the scope of which is to be determined by the scope of the appended claims.

We claim:

1. Apparatus for authenticating access to data storage record, comprising:
   a. means for preparing pattern carrier means containing a predetermined unique geometrical micro pattern applied by laser radiation;
   b. means including said pattern carrier means for applying on said record an unerasable authentication pattern corresponding to said pattern on said carrier means;
   c. means for passing said laser radiation through the said authentication pattern by scanning said radiation over the surface of said pattern carrier means, said micro pattern of the carrier means being applied to the record in a plurality of spaced positions thereon, the spacing between the positions being known; and
   d. means including said pattern carrier means for comparing the micro pattern on said record in at least one of said positions with the authentication pattern of said pattern carrier means.

2. A system for authenticating access to a data storage record, comprising:
   a. means for preparing pattern carrier means containing a predetermined unique geometrical micro pattern applied by laser radiation;
   b. means including said pattern carrier means for applying on said record an unerasable authentication pattern corresponding to said pattern on said carrier means;
   c. means for passing said laser radiation through the said authentication pattern by scanning said radiation over the surface of said pattern carrier means, said micro pattern of the carrier means being applied to the record in a plurality of spaced positions thereon, the spacing between the positions being known;
   d. means including said pattern carrier means for comparing the micro pattern on said record in at least one of said positions with the authentication pattern of said pattern carrier means; and
   e. means for comparing the authentication pattern in at least two spaced positions on said record and for determining the spacing between said at least two positions.

3. The system as in claim 2 including means for comparing the determined spacing with the known spacing.

4. The system as in claim 3 including means for controlling the reading of data from said record in response to the means for comparing said pattern spacings.

5. The system as in claim 1 including means for comparing the authentication pattern at each of a plurality of spaced patterns on said record and for determining the spacing between such plurality of spaced patterns.

6. The system as in claim 5 including means for controlling the reading of data from said record in response to said means for comparing said patterns and a plurality of pattern spacings.

7. An access authenticating system comprising;
   a. means responsive to machine readable information indicative of unique coded pattern carried by stored means to be retrieved;
   b. a plurality of authenticating unique coded master pattern carrier means;
   c. means responsive to said machine readable information to select the appropriate one of said plurality of authenticating unique coded master pattern carrier means;
   d. means for comparison of said unique coded pattern on said stored means with the appropriate authenticating master pattern on the matching selected unique coded master pattern carrier means; and
   e. means authorizing access when the compared patterns match.

8. The access authentication system of claim 7 including means authorizing access when the compared patterns match.

9. The access authentication system of claim 7 wherein the coded pattern means includes redundant coded micro patterns.

10. The access authentication system of claim 9 wherein the coded micro patterns comprise an array of micro-perforations.

11. The access authentication system of claim 7 wherein the stored means is an item with said coded pattern carried thereby and including means for delivery of such item.

12. The system of claim 7 in which the stored means is a long strip data storage record, means for traversing the record in a record handling means including transducer means to read digital data on said data storage record means, and including means for stopping the traverse of said data storage record means when the coded pattern on said strip record is not the selected micro pattern on said coded pattern carrier.

* * * * *